United States Patent
Lu et al.

(10) Patent No.: US 11,326,975 B2
(45) Date of Patent: May 10, 2022

(54) METHOD OF SENSING LEAKING GAS

(71) Applicant: MAS AUTOMATION CORP., Hsinchu (TW)

(72) Inventors: Chin-Cheng Lu, Hsinchu (TW); Cheng-Min Li, Hsinchu (TW); Pei-Chih Lin, Hsinchu (TW)

(73) Assignee: MAS AUTOMATION CORP., Hsinchu (TW)

( * ) Notice: Subject to any disclaimer, the term of this patent is extended or adjusted under 35 U.S.C. 154(b) by 0 days.

(21) Appl. No.: 16/943,758

(22) Filed: Jul. 30, 2020

(65) Prior Publication Data

US 2021/0278306 A1    Sep. 9, 2021

(30) Foreign Application Priority Data

Mar. 5, 2020 (TW) ................................. 109202442
Jun. 29, 2020 (TW) ................................. 109121857

(51) Int. Cl.
*G01M 3/26* (2006.01)

(52) U.S. Cl.
CPC ..................................... *G01M 3/26* (2013.01)

(58) Field of Classification Search
CPC ............ G01M 3/06; G01M 3/10; G01M 3/16; G01M 3/146; G01M 3/26; G01M 3/226; G01M 3/227; G01M 3/3254; G01M 3/38
See application file for complete search history.

(56) References Cited

U.S. PATENT DOCUMENTS

| | | | | |
|---|---|---|---|---|
| 1,959,863 | A * | 5/1934 | Griss | G01M 3/06 116/264 |
| 2,967,450 | A * | 1/1961 | Shields | G01F 1/704 73/199 |
| 3,103,910 | A * | 9/1963 | Smith | G01M 3/06 116/276 |
| 3,114,257 | A * | 12/1963 | Foster | G01F 3/00 73/45.5 |
| 3,221,540 | A * | 12/1965 | Kilbourn | G01M 3/06 73/49.1 |
| 3,342,062 | A * | 9/1967 | Smith | G01M 3/10 73/49.2 |
| 3,516,284 | A * | 6/1970 | Lockard | G01M 3/10 250/573 |
| 3,583,435 | A * | 6/1971 | Stewart | F17D 5/02 137/551 |
| 3,813,922 | A * | 6/1974 | Oswald | G01M 3/3254 73/49.2 |
| RE29,330 | E * | 8/1977 | Stewart | F16L 41/02 137/551 |

(Continued)

FOREIGN PATENT DOCUMENTS

| | | | | |
|---|---|---|---|---|
| GB | 752250 A | * | 7/1956 | ............. G01M 3/06 |
| GB | 2493366 B | * | 5/2017 | ............. G01N 29/46 |

(Continued)

*Primary Examiner* — David A. Rogers
(74) *Attorney, Agent, or Firm* — Chun-Ming Shih; HDLS IPR Services

(57) ABSTRACT

A method of sensing leaking gas includes controlling the height of a gas injection port in the liquid away from the liquid surface to guide the leaking gas into the liquid through the gas injection port to generate bubbles, and detecting the flow rate of the bubbles generated in the liquid to improve the sensing accuracy of leaking gas.

3 Claims, 3 Drawing Sheets

(56) References Cited

U.S. PATENT DOCUMENTS

| | | | | |
|---|---|---|---|---|
| 4,068,522 A * | 1/1978 | Poe | G01M 3/08 | |
| | | | 73/40.5 R | |
| 4,077,427 A * | 3/1978 | Rosan, Jr. | F16K 37/00 | |
| | | | 116/266 | |
| 4,320,653 A * | 3/1982 | Bernhardt | G01M 3/34 | |
| | | | 73/40 | |
| 4,419,883 A * | 12/1983 | Gelston, II | G01M 3/10 | |
| | | | 324/642 | |
| 4,453,399 A * | 6/1984 | Thompson | G01M 3/2807 | |
| | | | 73/40.5 R | |
| 4,524,608 A * | 6/1985 | Bellefeuille | G01M 3/086 | |
| | | | 73/40.5 R | |
| 4,862,733 A * | 9/1989 | Hyfantis, Jr. | G01M 3/3245 | |
| | | | 73/49.2 | |
| 4,885,931 A * | 12/1989 | Horner | G01F 23/14 | |
| | | | 73/49.2 | |
| H1045 H * | 5/1992 | Wilson | 73/40 | |
| 5,337,597 A * | 8/1994 | Peake | G01M 3/10 | |
| | | | 73/45.5 | |
| 5,471,867 A * | 12/1995 | Tuma | G01M 3/2892 | |
| | | | 73/290 R | |
| 5,524,682 A * | 6/1996 | Amonson | G05D 9/12 | |
| | | | 141/198 | |
| 5,636,547 A * | 6/1997 | Raj | G01F 23/162 | |
| | | | 73/299 | |
| 5,650,561 A * | 7/1997 | Tubergen | G01F 23/165 | |
| | | | 73/1.73 | |
| 5,661,228 A * | 8/1997 | Young | G01F 23/14 | |
| | | | 73/299 | |
| 5,922,943 A * | 7/1999 | Chapman, IV | G01M 3/226 | |
| | | | 73/40.7 | |
| 6,003,363 A * | 12/1999 | Danielson | G01M 3/06 | |
| | | | 73/49.2 | |
| 6,035,700 A * | 3/2000 | Shaw | G01M 3/106 | |
| | | | 73/40.7 | |
| 6,568,282 B1 * | 5/2003 | Ganzi | B01D 65/102 | |
| | | | 73/38 | |
| 6,601,449 B1 * | 8/2003 | Jones | G01F 23/167 | |
| | | | 73/299 | |
| 6,854,320 B2 * | 2/2005 | Wolford | G01M 3/3263 | |
| | | | 73/40 | |
| 7,415,893 B2 * | 8/2008 | Takeda | G01F 1/663 | |
| | | | 73/861.18 | |
| 7,448,256 B2 * | 11/2008 | Jenneus | G01M 3/226 | |
| | | | 73/49.2 | |
| 7,739,901 B2 * | 6/2010 | Wolford | G01M 3/3263 | |
| | | | 73/49.2 | |
| 8,261,593 B1 * | 9/2012 | Sanders | G01M 3/3245 | |
| | | | 73/40.5 R | |
| 8,468,876 B2 * | 6/2013 | Wolford | G01M 3/3263 | |
| | | | 73/49.2 | |
| 2003/0140697 A1 * | 7/2003 | Van Ee | G01F 23/167 | |
| | | | 73/299 | |
| 2005/0160794 A1 * | 7/2005 | Sonntag | G01M 3/10 | |
| | | | 73/40 | |
| 2007/0161901 A1 * | 7/2007 | Takeda | G01F 1/663 | |
| | | | 600/455 | |
| 2011/0132076 A1 * | 6/2011 | Brockmann | B01D 19/0042 | |
| | | | 73/40.7 | |
| 2019/0323943 A1 * | 10/2019 | Knollenberg | G01N 15/1459 | |

FOREIGN PATENT DOCUMENTS

| | | | | |
|---|---|---|---|---|
| JP | 58123439 A * | 7/1983 | | G01M 3/10 |
| JP | 59077329 A * | 5/1984 | | G01M 3/10 |
| JP | 60063438 A * | 4/1985 | | G01M 3/10 |
| JP | 2007047056 A * | 2/2007 | | |
| RU | 2631083 C1 * | 9/2017 | | |

\* cited by examiner

METHOD OF SENSING LEAKING GAS

FIELD OF THE INVENTION

The present invention relates to a gas detection technology, and more particularly to a method of sensing leaking gas.

DESCRIPTION OF RELATED ART

Generally, for example, there is a process gas in industrial equipment, such as heat exchange, boilers, heat treatment, natural gas, or exhaust gas treatment. The process gas mostly has a specific pressure, and is constructed using structural elements, such as pipes or cabins for diversion or storage.

Due to the existence of industrial equipment with process gas, after a period of use, the phenomenon of process gas leakage is often prone to affect the availability of such industrial equipment. If the leaking process gas is toxic, the damages to the environment, human health and even safety will pose a considerable threat. Therefore, once the process gas in such industrial equipment leaks, it must be immediately detected to protect the equipment's availability, environmental hygiene and public safety.

It is also known that today there are industrial equipment for process gas. Most of the time, gas measuring sensors, gas flow meters and other measuring elements are installed in gas diversion pipes or gas storage compartments to detect whether process gas leaks or to measure leaking flow, leaking volume, etc. However, since the volume of the gas is usually compressible, it is difficult to obtain the accuracy of the detection of the data, such as the flow rate and volume, when the small flow gas leaks in the prior art, and it is urgent to improve.

SUMMARY OF THE INVENTION

In view of this, the purpose of the present invention is to provide a gas leakage sensing technology, in particular to guide the leakage gas dissolved in a liquid to generate bubbles, and further to monitor the actual situation of bubble generation to achieve more sensitive and precise gas leakage detection.

To this end, the present invention provides a method of sensing leaking gas comprising the following steps:
step S1: controlling the height of a gas injection port in the liquid away from the liquid surface to guide the leaking gas into the liquid through the gas injection port to generate bubbles; and
step S2: detecting a flow rate of bubbles generated in the liquid.

In another implementation of the present invention, the height of the gas injection port from the liquid level is regulated so that the vent pressure of the leaking gas is greater than the liquid pressure.

In another implementation of the present invention, the flow rate of bubbles generated in the liquid is detected between the gas injection port and the liquid surface.

According to the present invention, the flow rate of bubbles generated in the liquid is detected by an ultrasound sensor.

In the above implementation of the present invention, the flow rate of bubbles generated in the liquid is optically detected.

According to the above technical means, the present invention has the advantage that the leaking gas is introduced into the liquid to generate bubbles, which can completely convert the leaking gas into a plurality of bubbles of the same volume to float up in the liquid, and through the monitoring of the bubbles, it is more sensitive and accurate to calculate the resulting data of leakage gas flow.

According to the above structural configuration means of the present invention, the technical effect that by sensing the size, amount of generated bubbles, and floating frequency of the bubbles generated in the liquid, the flow rate and volume of the leaking gas are obtained to improve the accuracy of sensing the leaking gas.

In addition, related technical details on which the present invention can be implemented will be described in subsequent implementations and drawings.

DETAILED DESCRIPTION OF THE PREFERRED EMBODIMENT

Figure 1:
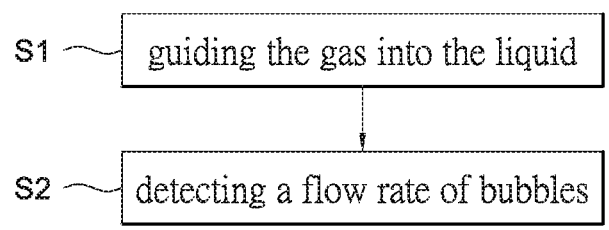
FIG. 1 is a flowchart of steps of the gas leakage sensing method of the present invention.
Figure 2:
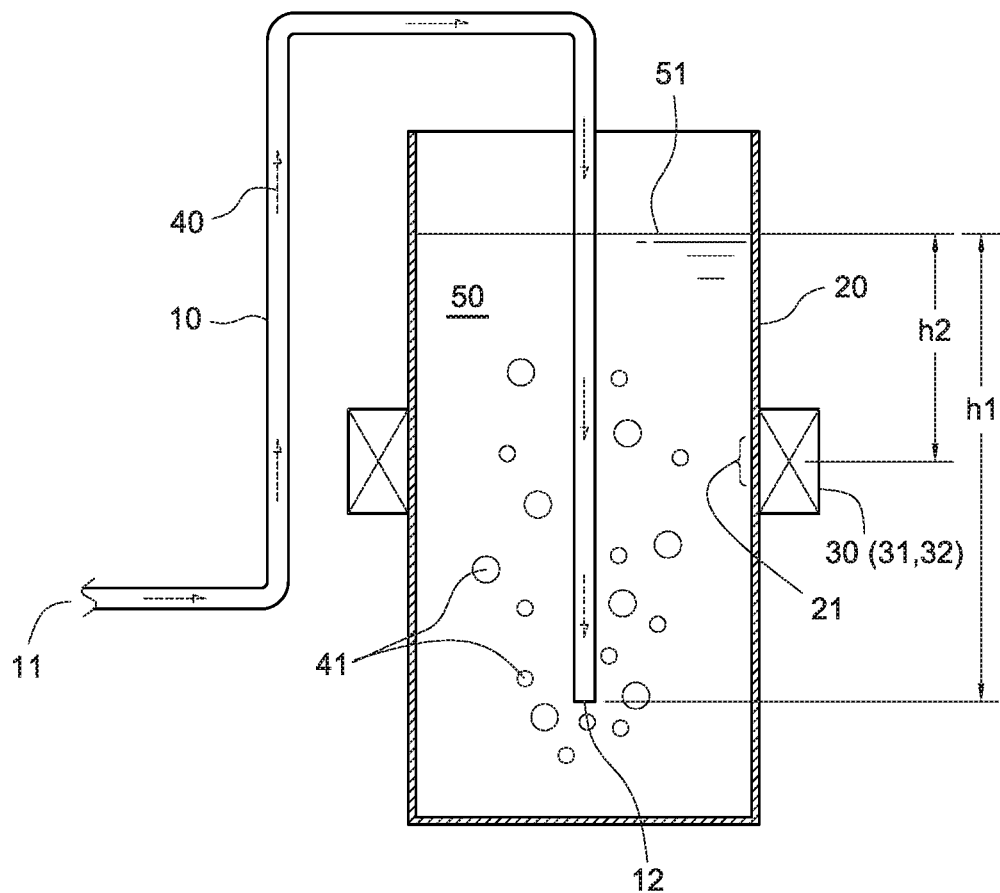
FIG. 2 is a configuration sectional view of the first embodiment of the present invention.

In order to fully explain the feasibility of the gas leakage sensing method provided by the present invention. First, referring to FIGS. 1-4, a method of sensing leaking gas comprising the following steps:
step S1: controlling the height of a gas injection port in the liquid away from the liquid surface to guide the leaking gas into the liquid through the gas injection port to generate bubbles; and
step S2: detecting a flow rate of bubbles generated in the liquid.

The role of the gas conduit 10 is to guide the leaking gas 40 of an industrial equipment, which may be a heat exchange equipment with a process gas, a boiler, a heat treatment equipment, a gas equipment or an exhaust gas treatment equipment. According to common knowledge, in order to prevent process gas leakage, such industrial equipment usually installs the gas conduit 10 for guiding leaking gas 40 at the locations where gas is easily leaked, such as a conduit connector, a cover connector, etc. of the diversion pipeline or the gas storage tank of the diversion process gas to prevent process gases from leaking into the atmosphere. Therefore, the gas conduit 10 has a gas inlet end 11 that receives the leaking gas 40 and a gas injection port 12 that discharges the leaking gas 40.

The liquid storage tank 20 may be surrounded by a transparent or opaque tank wall structure so that the liquid storage tank 20 communicates with the atmosphere and is filled with a liquid 50. The liquid surface 51 of the liquid 50 may be formed in the liquid storage tank 20. The liquid 50 may be water or other oil or solvent that does not affect the generation and floating of the gas bubbles 41. In different implementations of the embodiments, the liquid surface 51 of the liquid 50 may also be formed in other liquid tanks or diversion pipeline communicating with the liquid storage tank 20. The gas injection port 12 of the gas conduit 10 must be implanted in the liquid 50 of the liquid storage tank 20 in order to guide the leaking gas 40 to generate bubbles 41 in the liquid 50 of the liquid storage tank 20.

Furthermore, a monitoring part 21 is formed on the tank wall of the liquid storage tank 20. In essence, the monitoring part 21 is located at a place for assembling or disposing the bubble sensing component 30, and the monitoring part 21 is away from the liquid surface. The height h1 of the gas injection port 12 from the liquid surface 51 must be larger than the height h2 of the monitoring part 21 from the liquid surface 51 (that is, h1>h2). In other words, the monitoring part 21 is located at a relatively higher liquid surface from the lower gas injection port 12 so that the bubble sensing component 30 on the monitoring part 21 can conveniently continuously monitor whether bubbles 41 are generated in the liquid 50 and detect how much the size, amount and frequency of the bubbles generated.

In the invention, step S2: detecting a flow rate of bubbles generated in the liquid. In the implementation of the first embodiment shown in FIG. 1-4, the bubble sensing component 30 may be an ultrasonic sensor 31 or a vision device 32 equipped with a charge coupled device (CCD). These bubble sensing components 30 can be easily arranged on the monitoring part 21 of the tank wall of the liquid storage tank 20 by assembling means such as locking, sticking or buckling. When the bubble sensing component 30 is an ultrasonic sensor 31, the monitoring part 21 may be transparent or opaque. The ultrasonic sensor 31 generates the ultrasonic waves to penetrate the transparent or opaque monitoring part 21 (formed by the tank wall of the liquid storage tank 20) in order to sense the bubbles 41 in the liquid 50 of the liquid storage tank 20. In addition, when the bubble sensing component 30 is a vision device 32, the monitoring part 21 must be transparent so that the vision device 32 can see through the transparent monitoring part 21 (formed by the tank wall of the liquid storage tank 20) to see through the bubbles 41 in the liquid 50 of the liquid tank 20.

Figure 3:
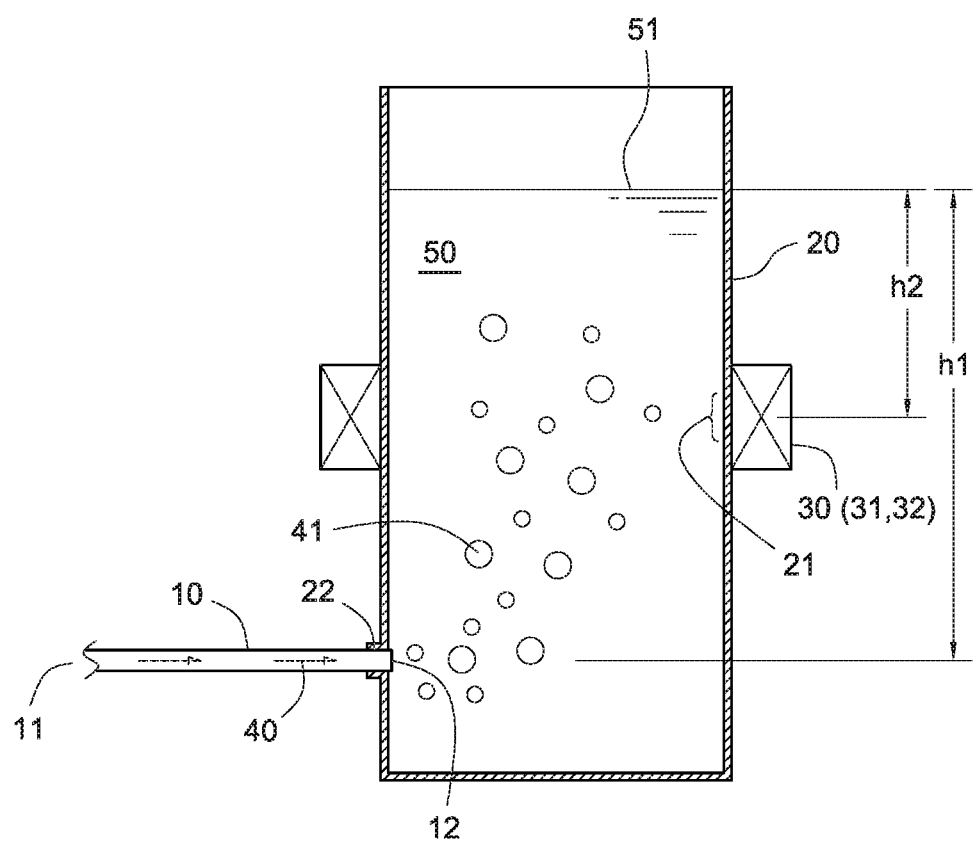
FIG. 3 is a configuration sectional view of the second embodiment of the present invention.

Please refer to refer to FIG. 3 to disclose a second embodiment of the present invention. It is demonstrated that a communicating hole 22 can be formed in the tank wall of the liquid storage tank 20, and the communicating hole 22 must be lower than the liquid surface 51 in order to facilitate that the gas injection port 12 provided with the gas conduit 10 can be connected to the communicating hole 22 and then implanted into the liquid 50, so that the gas conduit 10 can achieve the role of guiding the leaking gas 40 to generate the bubbles 41 in the liquid 50 of the liquid storage tank 20. Except for these, the remaining implementation details are the same as those of the above first embodiment.

Figure 4:
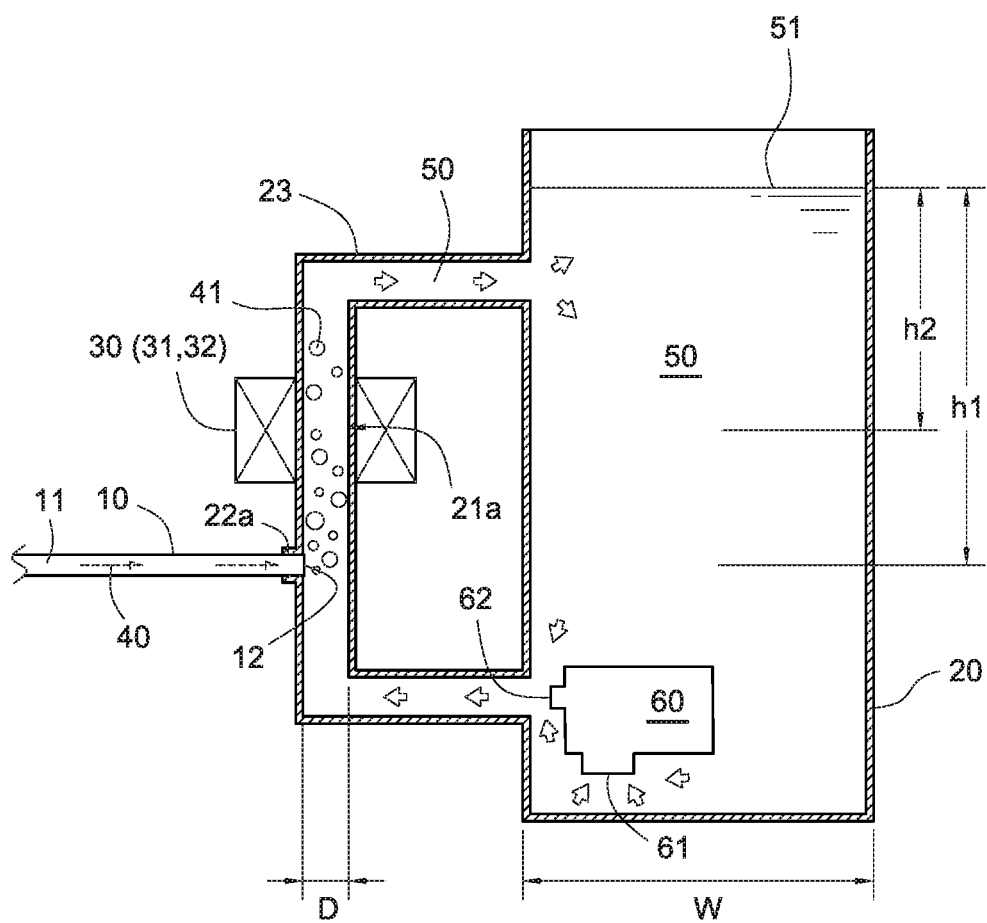
FIG. 4 is a configuration sectional view of the third embodiment of the present invention.

Please refer to FIG. 4 to disclose a third embodiment of the present invention. It is described that the tank wall of the liquid storage tank 20 is also forked or connected with a manifold 23, which is used for flow guidance. The liquid 50 in the liquid storage tank 20 enters so that the level of the manifold 23 can be lower than that of the liquid surface 51. In addition, the diameter D of the manifold 23 may be smaller than the width W of the liquid storage tank (that is, D<W), and both ends of the manifold 23 can be connected to the liquid storage tank 20 so that the liquid 50 can flow in the manifold 23. The communicating hole 22a in the second embodiment can be formed in this third embodiment. On the tank wall of the manifold 23, and the communicating hole 22a must also be located at a lower level than that the liquid surface 51, so that the gas injection port 12 of the gas conduit 10 is connected to the communicating hole 22a and then implanted in the liquid 50. The monitoring part 21a in the first and second embodiments described above is located on the pipe wall of the manifold 23 in this embodiment with the other remaining implementation details are the same as those in the above embodiment.

Referring to FIG. 4 again, in the third embodiment described above, a liquid pumping motor 60 is disposed in the liquid 50 of the liquid storage tank 20, and the liquid pumping motor 60 has a liquid intake 61 and a liquid drain 62. The liquid intake 61 captures liquid in the liquid 50, and is connected to or adjacent to the corresponding communicating hole 22 or 22a through the liquid drain 62 so as to drive the high-pressure liquid 50 into the manifold 23 to prevent the generation of insufficient vacuum or liquid volume in the liquid 50 in the manifold 23 to affect the generation of bubbles 41.

To sum up, the present invention relies on the ultrasonic penetrating sensing ability and charge-coupled device (CCD) recognition ability to detect the generation of bubbles 41 in the liquid 50, and the size of the bubbles 41. Both the quantity and the floating frequency can produce a sharp and accurate detection effect, and the above-mentioned bubble sensing component 30 is also convenient for transmitting the signal of the detected bubbles to the corresponding signal control unit, thereby accurately obtaining the flow rate of the leaking gas 40 and volume and other data. It can be seen that this invention is a fully implementable technology in the industry.

The above embodiments merely demonstrate the preferred embodiments of the present invention, but they cannot be understood as a limitation on the scope of the patents of the present invention. Therefore, the present invention shall be subject to the content of the claims defined in the scope of the patent application.

We claim:

1. A method of sensing leaking gas comprising the following steps:

step S1: determining a height of a gas injection port away from the liquid surface in a liquid storage tank such that a vent pressure of the leaking gas is greater than the liquid pressure, the gas injection port connecting to a manifold extending from a side wall of the liquid storage tank, a pumping motor pumping the liquid into the manifold towards the gas injection port, and the leaking gas being guided into the liquid through the gas injection port to generate bubbles; and step S2: detecting a flow rate of bubbles generated in the liquid between the gas injection port and the liquid surface.

2. The method of sensing leaking gas according to claim 1, wherein the flow rate of bubbles generated in the liquid is detected by an ultrasound sensor.

3. The method of sensing leaking gas according to claim 1, wherein the flow rate of bubbles generated in the liquid is optically detected.

* * * * *